United States Patent
Huang et al.

(10) Patent No.: US 10,295,056 B2
(45) Date of Patent: May 21, 2019

(54) MODE TRANSITION CONTROL IN A CVT WITH FIXED GEAR FUNCTIONALITY

(71) Applicant: GM GLOBAL TECHNOLOGY OPERATIONS LLC, Detroit, MI (US)

(72) Inventors: Ying Huang, Shanghai (CN); Chengwu Duan, Shanghai (CN)

(73) Assignee: GM Global Technology Operations LLC., Detroit, MI (US)

( * ) Notice: Subject to any disclaimer, the term of this patent is extended or adjusted under 35 U.S.C. 154(b) by 200 days.

(21) Appl. No.: 15/532,264

(22) PCT Filed: Nov. 26, 2014

(86) PCT No.: PCT/CN2014/092302
§ 371 (c)(1),
(2) Date: Jun. 1, 2017

(87) PCT Pub. No.: WO2016/082132
PCT Pub. Date: Jun. 2, 2016

(65) Prior Publication Data
US 2017/0314676 A1    Nov. 2, 2017

(51) Int. Cl.
*F16H 61/662*    (2006.01)
*F16G 1/28*    (2006.01)
(Continued)

(52) U.S. Cl.
CPC .......... *F16H 61/66272* (2013.01); *F16G 1/28* (2013.01); *F16G 5/20* (2013.01);
(Continued)

(58) Field of Classification Search
CPC ......... F16H 61/66272; F16H 61/66236; F16H 2061/66295; F16H 2059/465
See application file for complete search history.

(56) References Cited

U.S. PATENT DOCUMENTS

| | | | | |
|---|---|---|---|---|
| 6,409,627 B2 * | 6/2002 | Bolz | ..................... | B60W 10/02 477/46 |
| 7,267,632 B2 * | 9/2007 | Ochiai | ................. | B60W 10/06 477/107 |

(Continued)

FOREIGN PATENT DOCUMENTS

| | | |
|---|---|---|
| EP | 1288532 A2 | 5/2003 |
| JP | 2004100826 A | 4/2004 |

(Continued)

*Primary Examiner* — Erin D Bishop
(74) *Attorney, Agent, or Firm* — Quinn IP Law

(57) ABSTRACT

A vehicle includes a power plant, continuously variable transmission (CVT), drive wheels, sensors, and controller. The CVT achieves a fixed gear/positive engagement and friction drive modes, and includes an input member that receives input torque from the power plant, an output member, and a variator assembly having drive and driven variator pulleys. The pulleys are connected to each other via an endless rotatable drive element, and to a respective one of the input and output members. Pulley actuators change a CVT speed ratio. The controller calculates a relative slip of the pulleys using measured speeds and displacements from the sensors, reduces the relative slip until the relative slip is below a calibrated speed limit or within a calibrated speed range via actuator control signal to the pulley actuators, and commands the fixed gear/positive engagement mode via positive engagement control signals to the CVT until the relative slip reaches zero.

16 Claims, 2 Drawing Sheets

(51) Int. Cl.
 *F16G 5/20* (2006.01)
 *F16H 9/24* (2006.01)
 *F16H 9/18* (2006.01)
 *F16H 55/17* (2006.01)
 *F16H 55/56* (2006.01)
 *F16H 61/00* (2006.01)
 *F16H 59/46* (2006.01)

(52) U.S. Cl.
 CPC ............... *F16H 9/18* (2013.01); *F16H 9/24* (2013.01); *F16H 55/171* (2013.01); *F16H 55/56* (2013.01); *F16H 61/66236* (2013.01); *F16H 61/66259* (2013.01); *F16H 2059/465* (2013.01); *F16H 2061/009* (2013.01); *F16H 2061/0087* (2013.01)

(56) References Cited

U.S. PATENT DOCUMENTS

| | | | |
|---|---|---|---|
| 8,892,318 B2* | 11/2014 | Doihara | F16H 61/66272 477/45 |
| 9,334,954 B2* | 5/2016 | Cho | F16H 61/66272 |
| 2009/0105041 A1 | 4/2009 | McKenzie et al. | |

FOREIGN PATENT DOCUMENTS

| | | | |
|---|---|---|---|
| JP | 2013127289 A | 6/2013 | |
| JP | 2014185716 A | 10/2014 | |

\* cited by examiner

MODE TRANSITION CONTROL IN A CVT WITH FIXED GEAR FUNCTIONALITY

CROSS-REFERENCE TO RELATED APPLICATIONS

This application is a United States National Stage application of, and therefore claims the benefit of, International Application No. PCT/CN2014/092302 filed Nov. 26, 2014, which is hereby incorporated by reference in its entirety.

TECHNICAL FIELD

The present disclosure relates to the control of a mode transition in a continuously variable transmission having fixed gear/positive engagement functionality.

BACKGROUND

A continuously variable transmission (CVT) is a power transmission providing infinite variability of speed ratios within a calibrated range. That is, while conventionally-geared transmissions typically use planetary gear sets and multiple rotating and/or braking clutches to establish a desired speed ratio, a CVT instead uses a variator assembly with a pair of variable-diameter pulleys to transition anywhere within the calibrated range of speed ratios. The pulleys are interconnected via an endless rotatable drive mechanism such as a chain or a drive belt. The drive mechanism resides in a variable diameter gap defined by conical sheave faces of the pulleys. One pulley is typically connected to an engine crankshaft and thus acts within the variator assembly as a driving/primary pulley. The other pulley is connected to an output shaft of the CVT to thereby act as a driven/secondary pulley. One or more planetary gear sets could be used on the input and/or output side of the variator assembly as needed to provide a desired power flow.

To vary the speed ratio in a CVT, a clamping pressure is typically applied to the primary and/or secondary pulley via one or more pulley actuators. The clamping pressure effectively squeezes opposing sheaves of the actuated pulley(s) together to change the width of the gap between the sheave faces. Variation in the gap size, which is also referred to as the pitch radius, causes the drive mechanism of the CVT to ride higher or lower within the gap depending on the direction of the gap size variation. The change in gap size changes the effective diameters of the variator pulleys and, as a result, ultimately determines the CVT speed ratio.

Certain emerging CVT designs are capable of achieving a fixed gear mode of operation in addition to a conventional friction drive mode. Fixed gear mode is achieved via the positive engagement of mating structure such as teeth or other suitable engagement features of the drive mechanism, the variator pulley shafts, and/or the conical faces of the pulley sheaves. Such fixed gear/positive engagement-type CVT designs increase the efficiency of the variator assembly relative to conventional CVT designs relying solely on friction between the drive mechanism and the pulley sheaves to transfer drive torque across the variator assembly.

SUMMARY

It is recognized herein that when varying the speed ratio of a fixed gear/positive engagement-type continuously variable transmission (CVT), the transition between a friction drive mode and a positive engagement/fixed gear drive mode, unless closely controlled as set forth hereinbelow, may adversely affect overall ride comfort and CVT component durability. The present control approach and underlying system can be used with any positive engagement CVT design having an endless rotatable drive element, which as used herein means any endless drive element such as a rubber and/or metal drive belt, chain, or other closed-loop/endless rotatable element. Example CVT embodiments may include those having rigid splines or teeth fixed on the pulley sheaves and/or the pulley shafts for mating engagement with teeth of the belt, moveable sheave/shaft teeth, or the like. For illustrative consistency, a splined/toothed pulley and belt design is described hereinafter without limiting the presently disclosed methodology to such a design.

A vehicle is set forth herein that uses such a control approach. In a possible embodiment, the vehicle includes a power plant, a CVT, sensors, and a controller. The power plant may be an engine, an electric motor, or other suitable torque generating device operable for generating an input torque to the CVT. The CVT, which is configured to achieve both of a fixed gear/positive engagement drive mode and a variable speed ratio/friction drive mode, includes an input member that receives the input torque from the power plant, an output member, and a variator assembly. The variator assembly includes a primary/drive pulley and a secondary/driven pulley connected to each other via an endless rotatable drive element and to a respective one of the input and output members. The variator assembly also includes first and second pulley actuators operable to move a sheave of a respective one of the variator pulleys to thereby change a speed ratio of the CVT.

The controller, which is in communication with the various sensors, is programmed to calculate a relative slip speed of the pulleys in a sufficiently short calibrated control loop, such that calculation is effectively continuous, using a measured input speed, output speed, and linear displacements of one or more of the pulleys or pulley actuators as determined by the sensors. The controller is also programmed to reduce the calculated relative slip at a calibrated rate until the calculated relative slip is below a calibrated speed limit or within a calibrated speed range, e.g., within 0.5 to 2.5% total relative slip or about 5-10 RPM in different example embodiments, doing so via transmission of actuator control signals, e.g., primary and/or secondary pressure commands, to at least one of the first and second pulley actuators. The controller initiates a transition from the friction drive mode to the fixed gear/positive engagement drive mode via transmission of positive engagement control signals to the CVT and confirms the transition is reached when the calculated relative slip reaches zero. This latter control action is intended to lock the endless rotatable drive element and pulleys together into the fixed mode, and may entail steps such as stepping up the clamping pressure or actuating an electromechanical device depending on the design of the CVT.

A CVT assembly is also disclosed herein that includes, in an example configuration, an input member that rotates at an input speed, an output member that rotates at an output speed, a variator assembly, sensors, and a controller. The variator assembly includes a pair of variator pulleys and an endless rotatable drive element which connects and transfers torque between the pulleys. The pulleys include a drive pulley connected to the input member and a driven member connected to the output member. The pulleys each include a respective pair of sheaves. The variator assembly further includes first and second pulley actuators operable to move a sheave of a respective one of the drive and driven pulleys to thereby change a speed ratio of the CVT.

The controller in this particular embodiment continuously calculates a relative slip of the drive and a driven pulleys during the friction drive mode of the CVT using a measured input speed, output speed, and one or more linear displacements of the pulleys or pulley actuators. The controller also reduces the calculated relative slip during the friction drive mode until the calculated relative slip is below a calibrated slip limit or within a calibrated speed range, doing so via transmission of actuator control signals to one or both of the pulley actuators. As is known in the art, secondary clamping pressure determines the total slip, but in order to maintain a constant speed ratio and reduce slip, both primary and secondary pressures are adjusted. Additionally, the controller commands a fixed gear/positive engagement mode of the CVT via transmission of positive engagement control signals to the CVT until the calculated relative slip reaches zero, with zero slip corresponding to the fixed gear mode.

A method of controlling a mode transition in a vehicle having a CVT with dual friction drive mode and fixed gear/positive engagement functionality is also disclosed. In a particular embodiment, the method includes measuring an input speed and output speed of a variator assembly of the CVT as well as a linear displacement of each of a drive and a driven pulley of the variator assembly. The method further includes calculating, via a controller, a relative slip of the pulleys during the friction drive mode using the measured input speed, output speed, and linear displacements.

Additionally, the method includes transmitting, when the calculated relative slip is within a calibrated speed range, actuator control signals from the controller to at least one of a pair of pulley actuators, each of which is connected to the other via an endless rotatable drive element and is operable to translate or move a sheave of the respective drive and driven pulleys to thereby reduce the calculated relative slip at a calibrated rate. Positive engagement control signals are thereafter transmitted from the controller to the CVT once the calculated relative slip is below a calibrated slip limit or within a calibrated speed range to thereby transition the CVT from the friction drive mode to the fixed gear/positive engagement mode.

The above features and advantages and other features and advantages of the present disclosure are readily apparent from the following detailed description when taken in connection with the accompanying drawings.

DETAILED DESCRIPTION

Figure 1:
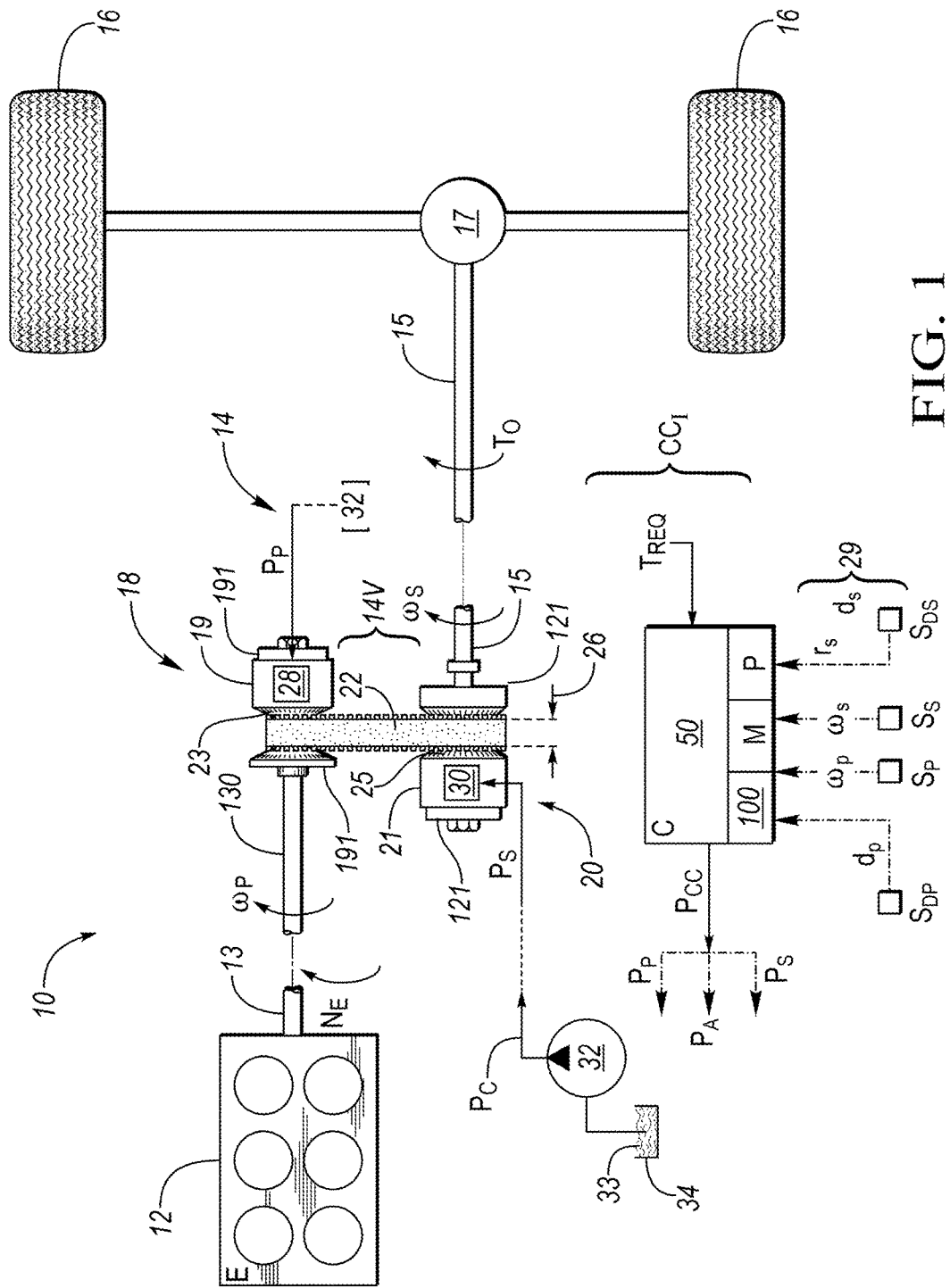
FIG. 1 is a schematic illustration of an example vehicle having an internal combustion engine and a fixed gear/positive engagement continuously variable transmission (CVT) controlled as set forth herein.

Referring to the drawings, wherein like reference numbers correspond to like or similar components throughout the several figures, an example vehicle 10 is shown schematically in FIG. 1. The vehicle 10 includes a power plant 12, which is shown as an example internal combustion engine (E) but which may be alternatively embodied as an electric machine or other suitable torque generating device. For illustrative consistency, the power plant 12 will be described hereinafter as being an engine 12 without being limited to such a design.

The vehicle 10 of FIG. 1 also includes a fixed gear/positive engagement continuously variable transmission (CVT) 14 and an associated controller (C) 50. As set forth below in further detail with reference to FIGS. 2 and 3, the controller 50 is configured, i.e., programmed in software via computer-readable and implementable instructions embodying a method 100 and sufficiently equipped in hardware, to control a mode transition between the two possible torque transfer modes of the CVT 14, i.e., a friction drive mode and a fixed gear/positive engagement drive mode. The controller 50 is programmed to reduce relative slip across the CVT 14 to zero as explained below, which occurs via transmission of actuator control signals (arrow $P_A$), which in an embodiment may be of at least one of a primary pressure command (arrow $P_P$) to a first pulley actuator 28 and a secondary pressure command (arrow $P_S$) to a second pulley actuator 30.

Intended benefits of the automatic execution of the method 100 aboard the vehicle 10 via the controller 50 include the achievement of a smoother transition between drive modes, improved drivability, reduced noise, vibration, and harshness, and extended component life. As is well known in the art, in a CVT 14 having fixed gear/positive engagement functionality, the friction drive mode provides infinite variability of speed ratios between a lowest and highest possible speed ratio. Such infinite variability continues up until positive engagement is achieved, whereupon a fixed gear ratio is sustained until control conditions warrant a change back to the friction drive mode. The enhancement of a CVT with positive engagement functionality can increase variator efficiency due to a reduced reliance on the hydraulic and/or electromechanical clamping forces ordinarily needed to maintain the friction drive mode. The present method 100 and controller 50 together operate to control slip and engagement during a transition between the different CVT drives modes as set forth herein with particular reference to FIG. 3.

The engine 12 of FIG. 1 includes a crankshaft 13 that is operable to rotate at engine speed (arrow $N_E$). The crankshaft 13 is connected to an input member 130 of the CVT 14, either directly or indirectly, e.g., via a torque converter or an input/disconnect clutch (not shown) depending on the design. The CVT 14 also includes an output member 15. The output member 15 ultimately delivers transmission output torque (arrow $T_O$) to a set of drive wheels 16 of the vehicle 10 via, by way of example, a final drive or a differential 17.

The CVT 14 shown in FIG. 1 includes a variator assembly 14V having a drive/primary pulley 18 and a driven/secondary pulley 20. The primary pulley 18 is connected to and driven by the input member 130 of the CVT 14. The secondary pulley 20 is connected to and drives the output member 150 of the CVT 14. The CVT 14 also includes an endless rotatable drive element or belt 22. As used herein, the term "belt" refers generally to any closed/endless rotatable drive element or closed-loop of a rubber and/or metal material suitable for transmitting torque from the primary pulley 18 to the secondary pulley 20 within the variator assembly 14V, including a chain or a conventional rubber and metal CVT drive belt. In other words, the term "belt" is inclusive of all endless rotatable drive elements of the type usable for transferring torque between pulleys in a CVT such as the CVT 14 of FIG. 1. In a possible embodiment, the belt 22 may include a plurality of interspaced belt teeth 22T (see FIG. 2) which are used to achieve positive engagement in fixed gear modes of the CVT 14 as explained in further detail below with reference to FIG. 2.

The respective primary and secondary pulleys 18 and 20 each have a pair of mating pulley sheaves 19 and 21, respectively, each with a respective conical sheave face 23 or 25 defining a variable-width gap 26. The belt 22 of the CVT 14 is positioned within the gap 26 and contacts the sheave faces 23 and 25. In the example FIG. 1 embodiment, engine speed (arrow $N_E$) acts as an input speed (arrow $\omega_P$) to the primary pulley 18. In other embodiments, another value other than the engine speed (arrow $N_E$) may serve as the input speed (arrow $\omega_P$), e.g., turbine speed when a torque converter is used downstream of the engine 12, rotor speed, etc. The secondary pulley 20 always rotates at a secondary speed (arrow $\omega_S$).

As is well known in the art, the width of the gap 26 may be varied via a movement of a moveable one of the pulley sheaves 19 and/or 21 of each the respective primary and secondary pulleys 18 and 20 to change the speed ratio of the CVT 14. To that end, the vehicle 10 of FIG. 1 includes respective first and second pulley actuators 28 and 30 responsive to respective primary and secondary pressure commands (arrows $P_P$, $P_S$ respectively) to compress the respective primary and secondary pulleys 18 and 20, i.e., to move the pulley sheaves 19 toward each other and/or to move the pulley sheaves 21 toward each other depending on whether the width of the gap 26 on the drive or driven side of the variator assembly 14V is being modified. An example embodiment of the first and second actuators 28 and 30 includes a hydraulic piston/cylinder system, although electromechanical, pneumatic, or other linear actuators may be used in the alternative within the intended inventive scope.

The first actuator 28 shown in FIG. 1 acts on a moveable one of the mating pulley sheaves 19, i.e., on a moveable sheave 191 of the primary pulley 18, in response to application of the primary pressure (arrow $P_P$). Likewise, the second actuator 30 acts on a moveable pulley sheave 121 of the secondary pulley 20 in response to the secondary pressure (arrow $P_S$). In other words, for each of the pulley sheaves 19 and 21, one of the pulley sheaves 19 and 21 is a moveable sheave, in this instance the pulley sheaves 191 and 121. The clamping pressure (arrow PC), i.e., arrows $P_P$ and/or $P_S$ depending on which of the pulley sheaves 121 and 191 is being moved, may be provided to the CVT 14 via a fluid pump 32 feeding both the primary and secondary pressures (arrows $P_P$ and $P_S$) as shown, with the fluid pump 32 drawing a suitable fluid 33 such as oil from a sump 34 and circulating the fluid 33 to the CVT 14 via hoses, fittings, and other suitable fluid conduit (not shown).

Figure 2:
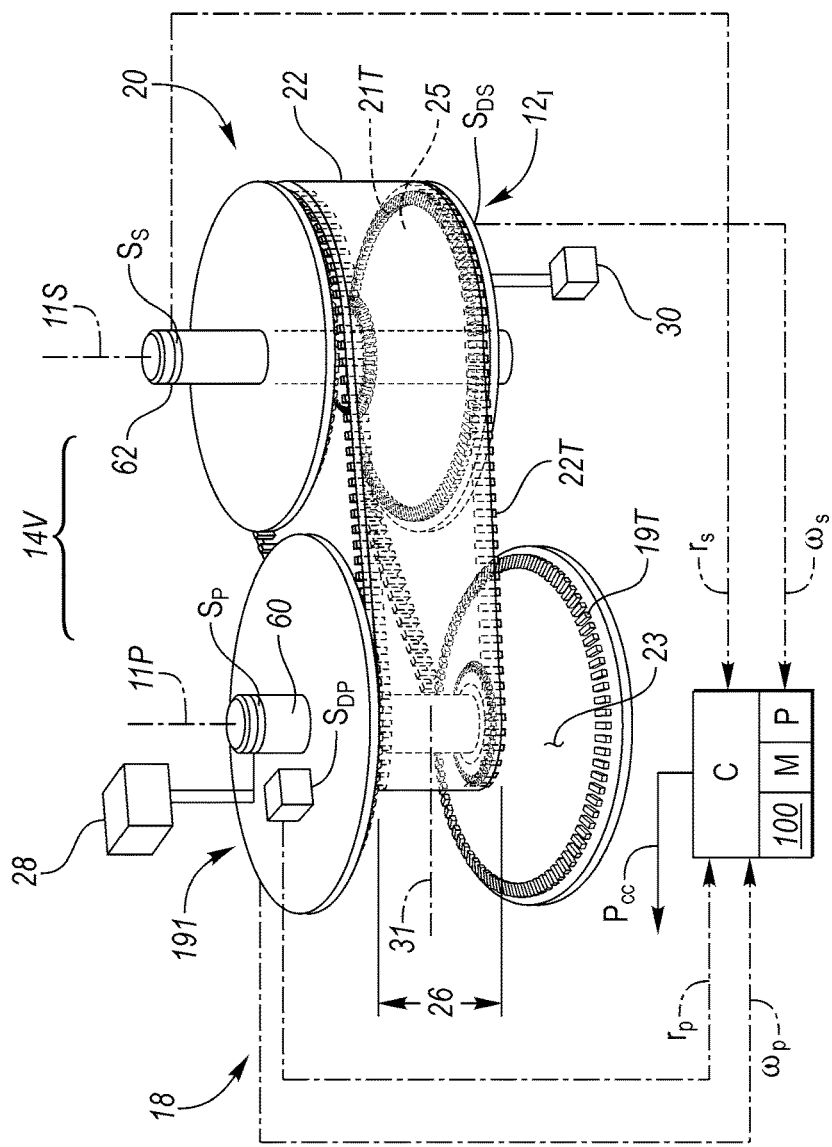
FIG. 2 is a schematic illustration of an example fixed gear/positive engagement CVT usable as part of the vehicle shown in FIG. 1 and controllable via the method of FIG. 3.

Each pulley sheave 19 and 21 of FIG. 1 is characterized by a substantially frusto-conical shape, i.e., a cone having its tip or narrow end removed. Each pulley sheave 19 and 21 further includes a respective plurality of sheave teeth 19T and 21T on its sheave faces 23, 25, as best shown in FIG. 2 and described in more detail below. The belt teeth 22T, when fully mated with the sheave teeth 19T and/or 21T in this embodiment, ensure that rotation of the respective primary or secondary pulleys 18 or 20 causes a rotation of the belt 22 to occur and vice versa.

During operation of the CVT 14 shown in FIG. 1, the engine 12 transmits input torque to the primary pulley 18. This causes the primary pulley 18 to rotate. As the primary pulley 18 rotates, the sheave face 23 contacts the belt 22. Friction at an interface between the sheave face 23 and the belt 22 causes the belt 22 to rotate. Because the belt 22 is rotationally coupled to the secondary pulley 20, rotation of the belt 22 in turn causes the secondary pulley 20 to rotate.

While the belt 22 rotates, the actuators 28 and/or 30 may apply pressure to the pulley sheaves 191 and/or 121 of the first and second pulley 18 and 19, respectively, in order to vary the speed ratio of the CVT 14. Such control decisions may be made by the controller 50 as part of an overall CVT shift control strategy.

The controller 50 used to control the overall slip and actuation process of the CVT 14 may be configured as one or more computer devices having memory (M). The controller 50 is in communication with a plurality of sensors 29, and is programmed to calculate a relative slip speed of the drive and a driven pulleys 18 and 20, respectively, using measured input speed ($\omega_P$), output/secondary speed ($\omega_S$), and linear displacements ($d_P$, $d_S$) to reduce the relative slip to zero. This control action occurs in the friction drive mode when relative slip is within a calibrated speed range, and is accomplished via transmission of the actuator control signals (arrow $P_{CC}$) to at least one of the first and second pulley actuators (28, 30). The controller 50 also commands a shift or transition from the friction drive mode to the fixed gear/positive engagement drive mode of the CVT, when relative slip is below a calibrated slip limit or within a calibrated speed range, via transmission of the positive engagement control signals (arrow $P_A$) to the CVT 14, i.e., the actuators 28 and/or 30 or another actuator depending on the design. This control action is sustained until the relative slip reaches zero.

The controller 50 may include hardware elements such as a processor (P), circuitry including but not limited to a timer, oscillator, analog-to-digital (A/D) circuitry, digital-to-analog (D/A) circuitry, a digital signal processor, and any necessary input/output (I/O) devices and other signal conditioning and/or buffer circuitry. The memory (M) may include tangible, non-transitory memory such as read only memory (ROM), e.g., magnetic, solid-state/flash, and/or optical memory, as well as sufficient amounts of random access memory (RAM), electrically-erasable programmable read-only memory (EEPROM), and the like. The method 100 may be recorded in memory (M) and executed by the processor (P) in the overall control of the vehicle 10.

The controller 50, which is in communication with the first and second actuators 28 and 30, receives a set of control inputs (arrow $CC_I$) from a plurality of sensors 29 as part of the method 100. The sensors 29 are collectively operable for continuously or periodically measuring the input speed ($\omega_P$) of the CVT 14, the output speed ($\omega_S$) of the CVT 14, and the axial linear displacements ($d_P$, $d_S$) of each of the drive and a driven pulleys 18 and 20. Therefore, the sensors 29 may include speed sensors $S_P$ and $S_S$ and displacement sensors $S_{DP}$ and $S_{DS}$. The input speed ($\omega_P$) to the CVT 14 may be measured by the speed sensor $S_P$, or it may be reported or calculated as a function of engine speed ($N_E$), e.g., from an engine control unit (not shown). The rotational output speed ($\omega_S$) of the secondary pulley 20 may be likewise measured by the speed sensor $S_S$. The displacement sensors $S_{DP}$ and $S_{DS}$ respectively measure the axial linear displacements ($d_P$, $d_S$) of a respective one of the moveable pulley sheaves 191 and 121. The controller 50 can then calculate primary and secondary radii $r_P$ and $r_S$ of the belt positions on the pulleys 18 and 20 respectively, with these terms used in the equations set forth below, using known geometric design information of the CVT 14 such as its half angle and initial state conditions as is well known in the art. That is, the controller 50 is aware at all times of the primary and secondary radii $r_P$ and $r_S$, which may be stored in its memory M and used as needed in the execution of method 100.

As part of its overall shift control functions, the controller 50 may also receive or determine an output torque request (arrow $T_{REQ}$). As is known in the art, the output torque request (arrow $T_{REQ}$) is largely determined by the actions of a driver of the vehicle 10, for instance via a throttle request, braking levels, present gear state, and the like. The controller 50 determines the need for a speed ratio change of the CVT 14 in response to the collective control inputs (arrow $CC_I$) and commands a required clamping pressure (arrow $P_C$) via transmission of actuator control signals (arrow $P_{CC}$) to achieve the desired ratio change at a calibrated rate.

As part of this strategy, the controller 50 ultimately adjusts the primary and/or secondary pressures (arrows $P_P$ and $P_S$) to the actuators 28 and 30 to control a transition between friction drive and positive engagement drive as explained below with reference to FIG. 3. In some embodiments, the actuator control signals (arrow $P_{CC}$) may include a separate positive engagement control signal (arrow $P_A$), for instance when the belt 22 or another portion of the CVT 14 is equipped with moveable or deployable teeth (not shown) or other mechanisms that are commanded on so as to positively engage the CVT 14 and thus enter a fixed gear mode.

A system including the CVT 14 and controller 50 of FIG. 1 are shown in more detail in FIG. 2. In this particular non-limiting example embodiment, the CVT 14 provides fixed gear/positive engagement functionality via direct engagement of its belt teeth 22T with the sheave teeth 19T and 21T of the respective pulley sheaves 19 and 21. The belt teeth 22T selectively engage the sheave teeth 19T and/or 21T at or near the limits of motion of the sheaves 191 and 121 to thereby achieve a fixed gear ratio.

The sheave teeth 19T and 21T are annularly arranged on the respective sheave faces 23 and 25, for instance circumscribing an axis of rotation 11P, 11S of respective pulley shafts 60 and 62 of the primary and secondary pulleys 18 and 20. Positive engagement occurs between the sheave teeth 19T or 21T and the belt teeth 22T when the rotating belt 22 is in brought into proximity with the sheave teeth 19T or 21T during a movement of the moveable pulley sheaves 191 and/or 121, such that the belt teeth 22T ultimately contact and then engage the sheave teeth 19T and/or 21T. This positive engagement establishes a fixed gear mode as noted above.

The belt 22 has a longitudinal center axis 31 as shown. The belt teeth 21T may be arranged orthogonally with respect to the longitudinal center axis 31 of the belt 22 to extend radially from a lateral edge 63 of the belt 22 toward the sheave teeth 19T, 21T. Although omitted from FIG. 2 for illustrative clarity, similar teeth could be provided on the pulley axles 60 and 62, and/or some teeth may be selectively moveable in response to the positive engagement control signals (arrow $P_A$) of FIG. 1. With respect to the control method 100, the particular design of the CVT 14 is not limiting, provided the CVT 14 is operable to establish both friction drive and positive engagement modes.

With respect to the example CVT 14 shown in FIGS. 1 and 2, during some speed ratios the sheave teeth 19T and 21T do not engage with the belt teeth 19T. When not positively engaged, the speed ratios are infinitely variable, with torque transmitted solely via friction between the belt 22 and the primary and secondary pulleys 18 and 20. As the belt teeth 22T come into direct contact with the sheave teeth 19T or 21T, the controller 50, via execution of the method 100 and using feedback from the various signals from the sensors 29 noted above with reference to FIG. 1, begins to reduce the slip between the primary and secondary pulleys 18 and 20 via the actuator control signals (arrow $P_{CC}$), and ultimately the primary and secondary pressures ($P_P$, $P_S$).

The sensors 29 of FIG. 1 may include a first or primary speed sensor $S_P$ connected to a pulley axle 60 of the drive pulley 18 as shown and a second or secondary speed sensor $S_S$ connected to a pulley axle 62 of the driven pulley 20. In this embodiment, the speed sensors $S_P$ and $S_S$ directly measure the respective input speed ($\omega_P$) and output or secondary speed ($\omega_S$).

When relative slip is below a calibrated slip limit or falls within a calibrated slip range, the controller 50 commands positive engagement via the positive engagement control signals (arrow $P_A$), e.g., the primary and secondary pressures ($P_P$, $P_S$) or the positive engagement control signals (arrow $P_A$), in a manner that depends on the embodiment. The controller 50 thereafter reduces the clamping pressure ($P_C$) to the actuators 28 and 30 after the controller 50 determines that positive engagement is attained. Reduction in clamping pressure reduces one or both of the primary and secondary pressures ($P_P$, $P_S$), as these values make up the total clamping pressure ($P_C$).

Figure 3:
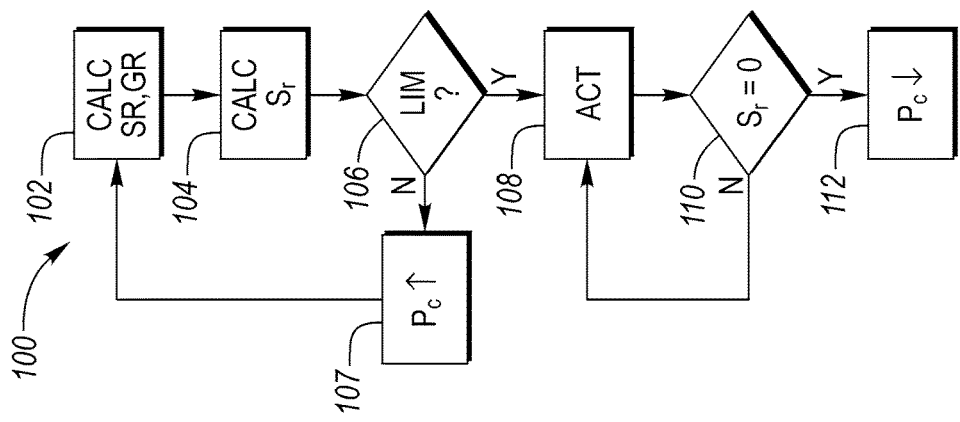
FIG. 3 is a flow chart describing a method for controlling a transition between a friction drive mode and a fixed gear/positive engagement mode in a CVT.

Referring to FIG. 3, an example embodiment of the method 100 for such slip and transition control is described for a mode transition in the CVT 14 of the type shown in FIGS. 1 and 2. The general steps of method 100 can also be performed with alternative designs having similar functionality, and therefore the method 100 is not limited to use with the particular CVT 14 described above.

Beginning with step 102, the controller 50 calculates a speed ratio (SR) and a geometric ratio (GR) of the CVT 14 of FIGS. 1 and 2. As is well known in the art, the term "speed ratio" refers to the ratio of the rotational speed of the primary pulley 18 to that of the secondary pulley 20, i.e., $$SR = \frac{\omega_P}{\omega_S}.$$

The geometric ratio is the distribution of the diameters of the gap (arrow 26 of FIG. 1) at the primary and secondary sides of the belt 22 as determined by the calculated primary and secondary radii ($r_P$ and $r_S$) as determined from the displacement sensors $S_{DP}$, $S_{DS}$. Therefore, step 102 includes receiving, via the controller 50, the measured displacements (arrows $d_P$ and $d_S$) and the measured rotational speeds ($\omega_P$, $\omega_S$) of FIG. 1.

For instance, using the primary and secondary speeds $\omega_P$ and $\omega_S$, the absolute slip speed (v) may be calculated as $v = \omega_P \cdot r_P - \omega_S \cdot r_S$, with the geometric ratio (GR) defined as $$GR = \frac{r_S}{r_P}.$$

The method 100 proceeds to step 104 once the controller 50 of FIG. 1 has initially calculated the speed ratio and the geometric ratio.

Step 104 entails calculating the relative slip rate ($s_r$) of the primary and secondary pulleys 18 and 20. The relative slip rate ($s_r$) may be calculated by the controller 50 as follows:

$$s_r = \frac{v}{\omega_S r_S} \cdot 100\% = \frac{SR - GR}{GR} \cdot 100\%$$

The method 100 proceeds to step 106 after the controller 50 finishes calculating the relative slip rate ($s_r$).

At step 106, the controller 50 next determines if the calculated relative slip ($s_r$) of step 104 is below a calibrated slip limit or otherwise falls within a calibrated slip range. As used herein, "calibrated" refers to a predetermined threshold value or range of values that is recorded in memory (M) of the controller 50 and referenced by the processor (P) during execution of step 106. The actual calibrated limits may vary with the speeds, speed or geometric ratios, and/or torques of the intended design. In a non-limiting example embodiment, the relative slip rate may be a low non-zero speed, such as a speed that is in the range of 5 RPM to 10 RPM. Other ranges can be used, provided the range is non-zero and low enough to be responsive to incremental adjustments in primary and/or secondary pressures (arrows $P_P$, $P_S$), e.g., less than about 50 RPM. If the slip rate falls within the calibrated limit or speed range, i.e., is less than the calibrated limit or within the range, the method 100 proceeds to step 108. Otherwise, the controller 50 proceeds to step 107.

Step 107 involves the process of reducing relative slip to a low non-zero value, i.e., less than typical slip values used in conventional CVT friction drive modes. As is known in the art, a conventional CVT will operate with a slip of about 1%, with the actual slip depending on a number of conditions such as speed ratio. With higher clamping pressures, the slip can be reduced but never goes to zero, which is a fundamental characteristic of the friction drive mode.

Thus, a goal of step 107 is to increase tension on the belt 22 and reduce slip to a low non-zero level while at the same time maintaining the present speed ratio. Consistent with this goal, step 107 may include increasing the clamping pressure (arrow $P_C$) of FIG. 1, which may be commanded via transmission of the actuator control signals (arrow $P_{CC}$). Depending on the control inputs ($CC_I$), step 107 may entail adjusting one or both of the primary and secondary pressures (arrows $P_P$ and $P_S$, respectively), or adjusting one or more motor currents in alternative motor-driven applications, to reduce the relative slip to zero at a calibrated rate, and then repeating step 102. The calibrated rate should provide the desired shift feel, substantially reducing and if possible eliminating any noise, vibration, and harshness due to engagement of the belt teeth 22T with mating teeth of the sheaves. Such control at step 107 may be considered as "micro slip" control, i.e., fine adjustments to the clamping pressure (arrow $P_C$) needed to reduce the relative slip, thereby preparing for direct engagement in step 108.

Step 108 includes commanding actuator engagement (ACT), i.e., commanding a positive engagement of the CVT 14. As step 107 results in a relative small, non-zero relative slip, step 108 entails any additional control action(s) needed for affirmatively commanding positive engagement to reach zero slip. In an example embodiment, step 108 may entail adjusting clamping pressure. However, the pressure adjusting pattern of step 108 differs from that of step 107. Unlike step 107, step 108 involves changing the speed ratio to positively engage structure of the CVT 14 and thereby enter the fixed gear mode. For instance, step 108 may be implemented via transmission of the positive engagement control signals (arrow $P_A$) to the first or second pulley actuators when such devices are the sole actuators in the CVT 14 to thereby cause a spike or step increase in clamping pressure (arrow $P_C$). As used herein, step increase means any transient or temporary increase in clamping pressure (arrow $P_C$) above levels needed for controlling relative slip to zero at step 107.

The positive engagement control signals (arrow $P_A$) of step 108 may vary with the design of the CVT 14. For instance, primary and/or secondary pressures ($P_P$, $P_S$) may be controlled to move the primary and/or secondary pulley 18 and/or 20 into engagement with the belt teeth 22T in the example embodiment of FIG. 2 and thus result in zero slip. In other systems, step 108 may entail commanding moveable teeth (not shown) of the belt 22 or other structure of the CVT 14 to deploy and engage to the same end effect of zero slip. The method 100 then proceeds to step 110.

At step 110, the controller 50 of FIG. 1 determines if the relative slip ($s_r$) is zero, and may ensure that zero slip is present for a calibrated duration, e.g., 1-2 seconds or any duration sufficient for determining that zero slip is not a transient state. The controller 50 determines that the fixed gear/positive engagement mode has been reached and proceeds as a result of making this determination to step 112. Positive engagement leads to a logic state change within the controller 50, for instance when the controller 50 is configured as a finite state machine. In such an embodiment, one set of control code may be used in friction mode and another in positive engagement mode, with the determination at step 110 that positive engagement is reached triggering a state change. The method 100 repeats step 108 when calculated relative slip is not zero.

Step 112 includes automatically reducing the clamping pressure (arrow $P_C$ of FIG. 1) upon achieving positive engagement. Fixed gear retains the zero slip, and thus maintenance of the higher clamping pressure (arrow $P_C$) is not required. The requirements of clamping pressure are generally much lower in fixed gear/positive engagement mode than they are in the friction mode. As a result, the controller 50 of FIG. 1 as an affirmative control step may reduce the clamping pressure (arrow $P_C$) at step 112 upon attaining positive engagement. Reduction in the clamping pressure (arrow $P_C$), by requiring less hydraulic or electro-mechanical force, leads to improved efficiency of the variator assembly 14V of FIG. 1. Additionally, the transition between drive modes of the CVT 14 is optimized in terms of smoothness and noise, which in turn should decrease long term stress and wear on the components of the CVT 14.

While the best modes for carrying out the disclosure have been described in detail, those familiar with the art to which this disclosure relates will recognize various alternative designs and embodiments within the scope of the appended claims.

The invention claimed is:

1. A vehicle comprising:
   a power plant operable for generating an input torque;
   a continuously variable transmission (CVT) operable to selectively achieve a fixed gear/positive engagement drive mode and a friction drive mode, wherein the CVT includes an input member that receives the input torque from the power plant, an output member, and a variator assembly having a drive pulley and a driven pulley connected to each other via an endless rotatable drive element and to a respective one of the input and output members, and first and second pulley actuators operable to move a sheave of a respective one of the pulleys to thereby change a speed ratio of the CVT;
   a plurality of sensors collectively operable for measuring an input speed of the CVT, an output speed of the CVT, and a linear displacement of each of the pulleys; and
   a controller in communication with the plurality of sensors, wherein the controller is programmed to calculate a relative slip speed of the pulleys using the measured input speed, output speed, and linear displacements, to reduce the relative slip until the relative slip is below a calibrated speed limit or within a calibrated speed range via transmission of actuator control signals to at least one of the first and second pulley actuators, and to command a transition from the friction drive mode to the fixed gear/positive engagement drive mode of the CVT via transmission of positive engagement control signals to the CVT until the relative slip reaches zero.

2. The vehicle of claim 1, wherein the power plant is an internal combustion engine.

3. The vehicle of claim 1, wherein the plurality of sensors includes a first speed sensor connected to a pulley axle of the drive pulley and a second speed sensor connected to a pulley axle of the driven pulley, wherein the first and second speed sensors directly measure the respective input speed and output speed.

4. The vehicle of claim 1, wherein the controller is programmed to reduce the relative slip until the relative slip is below a calibrated speed limit or within a calibrated speed range via transmission, as the actuator control signal, of at least one of a primary pressure command to the first pulley actuator and a secondary pressure command to the second pulley actuator.

5. The vehicle of claim 1, wherein the endless rotatable drive element includes a plurality of teeth and the sheaves of the drive and driven pulleys include mating sheave teeth, and wherein the fixed gear/positive displacement mode is achieved when the teeth of the endless rotatable drive element directly engage the mating sheave teeth of at least one of the drive and driven pulleys.

6. The vehicle of claim 5, wherein the teeth of the endless rotatable drive element are orthogonally arranged with respect to a longitudinal axis of the endless rotatable drive element and the mating sheave teeth radially extend from a conical face of each of the sheaves.

7. A continuously variable transmission (CVT) assembly comprising:
- an input member having an input speed;
- an output member having an output speed;
- a variator assembly having a pair of variator pulleys and an endless rotatable drive element which connects and transfers torque between the pair of variator pulleys, including a drive pulley connected to the input member and a driven member connected to the output member, wherein the drive and driven pulleys each include a pair of sheaves;
- a first pulley actuator operable to move one of the pair of sheaves of a respective one of the drive and driven pulleys to thereby change a speed ratio of the CVT;
- a plurality of sensors collectively operable for measuring the input and output speeds of the CVT and a linear displacement of each of the drive pulley and the driven pulley; and
- a controller in communication with the plurality of sensors, wherein the controller is programmed to calculate a speed ratio and a geometric ratio of the CVT during a friction drive mode of the CVT using the measured input speed, output speed, and linear displacements, to calculate a relative slip of the drive and driven pulleys during a friction drive mode of the CVT using the calculated speed ratio and the geometric ratio, to control the relative slip during a friction drive mode until the relative slip is below a calibrated speed limit or within a calibrated speed range, via transmission of an actuator control signal to the first pulley actuator, and to command a fixed gear/positive engagement mode of the CVT via positive engagement control signals to the CVT until the relative slip is zero.

8. The CVT of claim 7, wherein the plurality of sensors includes a first speed sensor connected to a pulley axle of the drive pulley and a second speed sensor connected to a pulley axle of the driven pulley, and wherein the first and second speed sensors directly measure the respective input speed and output speed.

9. The CVT of claim 7, wherein the controller is programmed to control the relative slip until the relative slip is below a calibrated speed limit or within a calibrated speed range via transmission, as the actuator control signal, of at least one of a primary pressure command to the first pulley actuator and a secondary pressure command to a second pulley actuator.

10. The CVT of claim 7, wherein the positive engagement control signals include a hydraulic clamping pressure command to at least one of the first actuator and a second actuator.

11. The CVT of claim 7, wherein the endless rotatable drive element includes a plurality of teeth and the sheaves of the drive and driven pulleys include mating sheave teeth, and wherein the fixed gear/positive displacement mode is achieved when the teeth of the endless rotatable drive element engage the sheave teeth of at least one of the drive and driven pulleys.

12. The CVT of claim 7, wherein the teeth of the endless rotatable drive element are orthogonally arranged with respect to a longitudinal axis of the endless rotatable drive element and the mating sheave teeth radially extend from a conical face of each of the sheaves.

13. A method for controlling a mode transition in a vehicle having a continuously variable transmission (CVT) with a friction drive mode and a fixed gear/positive engagement drive mode, the method comprising:
- measuring an input speed of a variator assembly of the CVT, an output speed of the variator assembly, and a linear displacement of each of a drive and a driven pulley of the variator assembly;
- calculating, via a controller, a speed ratio and a geometric ratio of the CVT during the friction drive mode of the CVT using the measured input speed, output speed, and linear displacements;
- calculating a relative slip of the drive and driven pulleys using the speed ratio and the geometric ratio;
- transmitting, when the relative slip is within a calibrated speed range, an actuator control signal from the controller to at least one of a pair of pulley actuators, each of which connected to the other via an endless rotatable drive element and is operable to move a respective moveable sheave of the drive and driven pulleys to thereby reduce the calculated relative slip until the relative slip is below a calibrated slip limit or within a calibrated speed range; and
- transmitting positive engagement control signals from the controller to the CVT, when the relative slip is below the calibrated speed limit or within the calibrated speed range, until the relative slip is zero to thereby transition the CVT to the fixed gear/positive engagement mode.

14. The method of claim 13, wherein the plurality of sensors includes a first speed sensor connected to a pulley axle of the drive pulley and a second speed sensor connected to a pulley axle of the driven pulley, and wherein measuring the respective input speed and output speed includes measuring the input and output speeds using the first and second speed sensors.

15. The method of claim 13, wherein transmitting an actuator control signal includes transmitting at least one of a primary pressure command to the first pulley actuator and a secondary pressure command to the second pulley actuator to modify a clamping pressure of the variator assembly.

16. The method of claim 13, wherein the endless rotatable drive element includes a plurality of teeth and the sheaves of the drive and driven pulleys include mating sheave teeth, and wherein transmitting the positive engagement control signals causes the teeth of the endless rotatable drive element to engage the mating sheave teeth of at least one of the drive and driven pulleys.

* * * * *